(12) United States Patent
Kaushik et al.

(10) Patent No.: US 9,276,843 B2
(45) Date of Patent: *Mar. 1, 2016

(54) VIRTUAL LINK AGGREGATION EXTENSION (VLAG+) ENABLED IN A TRILL-BASED FABRIC NETWORK

(71) Applicant: International Business Machines Corporation, Armonk, NY (US)

(72) Inventors: Meenakshi R. Kaushik, Sunnyvale, CA (US); Chandramouli Radhakrishnan, San Jose, CA (US); Venkatesan Selvaraj, Sunnyvale, CA (US); Daljeet Singh, Watsonville, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/064,024

(22) Filed: Oct. 25, 2013

(65) Prior Publication Data

US 2014/0269418 A1  Sep. 18, 2014

Related U.S. Application Data

(63) Continuation of application No. 13/797,849, filed on Mar. 12, 2013.

(51) Int. Cl.
*H04L 12/713* (2013.01)
*H04L 12/18* (2006.01)
*H04L 12/709* (2013.01)

(52) U.S. Cl.
CPC .............. *H04L 45/586* (2013.01); *H04L 12/18* (2013.01); *H04L 45/245* (2013.01)

(58) Field of Classification Search
USPC ........................................... 370/390
See application file for complete search history.

(56) References Cited

U.S. PATENT DOCUMENTS

| 8,134,922 | B2 | 3/2012 | Elangovan et al. |
| 9,143,444 | B2 | 9/2015 | Kaushik et al. |
| 2006/0072532 | A1 | 4/2006 | Dorenbosch et al. |
| 2006/0109801 | A1 | 5/2006 | Ashwood Smith |

(Continued)

OTHER PUBLICATIONS

Eastlake, Donald, E.; RBRIDGES and the TRILL Protocol, Oct. 2010.*

(Continued)

*Primary Examiner* — Melvin Marcelo
*Assistant Examiner* — Peter Solinsky
(74) *Attorney, Agent, or Firm* — Zilka-Kotab, PC (57) ABSTRACT

In one embodiment, a method for providing virtual link aggregation (vLAG) in a transparent interconnection of lots of links (TRILL)-enabled network, includes creating a virtual routing bridge logically connected to a first physical routing bridge and a second physical routing bridge to form a vLAG group at an edge of the TRILL-enabled network; determining a first distribution tree linking the first physical routing bridge to every other routing bridge in the TRILL-enabled network in a non-repeating fashion, ending with the second physical routing bridge; determining a second distribution tree linking the second physical routing bridge to every other routing bridge in the TRILL-enabled network in a non-repeating fashion, ending with the first physical routing bridge; receiving a multicast packet at the virtual routing bridge from one of the physical routing bridges; and distributing the multicast packet according to either the first or the second distribution tree thereby preventing looping.

19 Claims, 10 Drawing Sheets

(56) References Cited

U.S. PATENT DOCUMENTS

| | | | |
|---|---|---|---|
| 2010/0046400 A1* | 2/2010 | Wu et al. | 370/256 |
| 2010/0226381 A1 | 9/2010 | Mehta et al. | |
| 2010/0246388 A1 | 9/2010 | Gupta et al. | |
| 2011/0019552 A1 | 1/2011 | Karaoguz et al. | |
| 2011/0194403 A1 | 8/2011 | Sajassi et al. | |
| 2011/0235523 A1 | 9/2011 | Jha et al. | |
| 2011/0280572 A1* | 11/2011 | Vobbilisetty et al. | 398/45 |
| 2011/0299527 A1 | 12/2011 | Yu et al. | |
| 2011/0299535 A1 | 12/2011 | Vobbilisetty et al. | |
| 2011/0299536 A1 | 12/2011 | Cheng et al. | |
| 2012/0177042 A1 | 7/2012 | Berman | |
| 2012/0278804 A1* | 11/2012 | Narayanasamy et al. | 718/1 |
| 2012/0320926 A1* | 12/2012 | Kamath et al. | 370/401 |
| 2013/0003733 A1* | 1/2013 | Venkatesan et al. | 370/390 |
| 2013/0003747 A1* | 1/2013 | Raman et al. | 370/401 |
| 2013/0107699 A1* | 5/2013 | Miclea | 370/228 |
| 2013/0121164 A1 | 5/2013 | Shabtay et al. | |
| 2013/0223449 A1* | 8/2013 | Koganti et al. | 370/392 |
| 2013/0315233 A1 | 11/2013 | Kamble et al. | |
| 2013/0332573 A1* | 12/2013 | Hegland et al. | 709/218 |
| 2014/0010077 A1* | 1/2014 | Busch et al. | 370/229 |
| 2014/0029412 A1* | 1/2014 | Janardhanan | 370/221 |
| 2014/0036924 A1 | 2/2014 | Christenson | |
| 2014/0115182 A1* | 4/2014 | Sabaa et al. | 709/232 |
| 2014/0140199 A1* | 5/2014 | Vobbilisetty et al. | 370/217 |
| 2014/0198636 A1* | 7/2014 | Thayalan et al. | 370/228 |
| 2014/0198656 A1* | 7/2014 | Venkatesh et al. | 370/235 |
| 2014/0198661 A1* | 7/2014 | Raman et al. | 370/236 |
| 2014/0198801 A1* | 7/2014 | Venkatesh | 370/401 |
| 2014/0219079 A1 | 8/2014 | Kapadia et al. | |
| 2014/0247754 A1 | 9/2014 | Venkata et al. | |
| 2014/0254374 A1 | 9/2014 | Janakiraman et al. | |
| 2014/0254590 A1 | 9/2014 | Yang et al. | |
| 2014/0269701 A1 | 9/2014 | Kaushik et al. | |

OTHER PUBLICATIONS

Touch et al., "Transparent Interconnection of Lots of Links (TRILL): Probelm and Applicability Statement (RFC5556)," IPCOM000183374D, May 1, 2009, pp. 1-35.

Varis et al., "Minimizing ARP Broadcasting in TRILL," 2009 IEEE Globecom Workshops, pp. 1-6.

M. Wadekar, "Enhanced Ethernet for Data Center: Reliable, Channelized and Robust," Proceedings of the 2007 15th IEEE Workshop on Local and Metropolitan Area Networks, 2007 IEEE, pp. 1-7.

U.S. Appl. No. 13/797,849, filed Mar. 12, 2013.

Jacobsen et al., "The Internet Protocol Journal," vol. 14, No. 3, Sep. 2011, pp. 1-32.

Brocade, "Brocade VCS Fabric Technical Architecture," Data Center, Technical Brief, 2012, pp. 1-65.

Perlman et al., "Routing Bridges (RBridges): Base Protocol Specification," Internet Engineering Task Force (IETF), RFC6325, Jul. 2011, pp. 1-99.

Non-Final Office Action from U.S. Appl. No. 13/797,849, dated Oct. 6, 2014.

Notice of Allowance from U.S. Appl. No. 13/797,849, dated May 15, 2015.

* cited by examiner

FIG. 6 ized data center,

VIRTUAL LINK AGGREGATION EXTENSION (VLAG+) ENABLED IN A TRILL-BASED FABRIC NETWORK

RELATED APPLICATIONS

This application is a continuation of copending U.S. patent application Ser. No. 13/797,849, filed Mar. 12, 2013, which is herein incorporated by reference.

BACKGROUND

The present invention relates to data center infrastructure and operation, and more particularly, this invention relates to enabling an extension of Virtual Link Aggregation (vLAG+) in a Transparent Interconnection of Lots of Links (TRILL)-based fabric network.

TRILL is a Layer-2 (L2) protocol which provides the ability to build a scalable Local Area Network (LAN) that is capable of replacing conventionally-used spanning-tree and other protocols. Details of the solution are described as part of the Internet Engineering Task Force (IETF) TRILL working group, found at http://datatracker.ietf.org/wg/trill/. A collection of entities called Routing Bridges (RBs) implement the TRILL protocol. RBs enhance some existing 802.1 bridges to function in a transparent manner. These RBs may either interoperate with or replace the functions of any existing 802.1 bridges.

In existing 802.1 bridge deployments, vLAG is a very popular LAG solution that allows a host, switch, or some other device to connect itself to two different 802.1 upstream bridges. The two upstream bridges work together to present a single LAG port instance so that the downstream devices do not perform any special tasks for the LAG to exist. The downstream devices work as though they are connected to two ports of a single bridge. In order to support this functionality, the two upstream bridges are connected through a link referred to as an Inter Switch Link (ISL). These two physical upstream bridges exchange information through the ISL. This solution supports an active-active scheme for all the VLANs carried on any LAG port.

However, when an existing 801.q bridge function is enhanced or replaced by a RB function, there are issues that occur that are not capable of being handled with conventional schemes that threaten to destroy the existing behavior of vLAG. The main issue is that when two RBs detect one another, one of the RBs asserts the Appointer Forwarder role. This mechanism elects only one of the RBs to be able to forward traffic for a given VLAN. This is not a desirable outcome because the active-active load balancing scheme for any given VLAN is broken when only one RB is forwarding all traffic. Load balancing is one of the main advantages of having vLAG span across multiple 801.q bridges, and with conventional techniques, it is not possible to take advantage of this load balancing.

SUMMARY

In one embodiment, a method for providing vLAG in a TRILL-enabled network includes creating a virtual routing bridge logically connected to a first physical routing bridge and a second physical routing bridge to form a vLAG group at an edge of the TRILL-enabled network, determining a first distribution tree linking the first physical routing bridge to every other routing bridge in the TRILL-enabled network in a non-repeating fashion, ending with the second physical routing bridge, determining a second distribution tree linking the second physical routing bridge to every other routing bridge in the TRILL-enabled network in a non-repeating fashion, ending with the first physical routing bridge, receiving a multicast packet at the virtual routing bridge from one of the physical routing bridges, and distributing the multicast packet according to either the first or the second distribution tree thereby preventing looping.

Other aspects and embodiments of the present invention will become apparent from the following detailed description, which, when taken in conjunction with the drawings, illustrate by way of example the principles of the invention.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In one approach, the issues with conventional spanning tree architectures may be solved by implementing virtual Link Aggregation (vLAG) extensions in a Transparent Interconnection of Lots of Links (TRILL)-based fabric network. This is referred to as vLAG+ herein.

In one general embodiment, a system includes a TRILL-enabled network that includes: a first physical routing bridge and a second physical routing bridge, logic adapted for creating a virtual routing bridge logically connected to the first physical routing bridge and the second physical routing bridge to form a vLAG group at an edge of the TRILL-enabled network, logic adapted for determining a first distribution tree linking the first physical routing bridge to every other routing bridge in the TRILL-enabled network in a non-repeating fashion, ending with the second physical routing bridge, and logic adapted for determining a second distribution tree linking the second physical routing bridge to every other routing bridge in the TRILL-enabled network in a non-repeating fashion, ending with the first physical routing bridge, wherein when a multicast packet is received by the virtual routing bridge from one of the physical routing bridges, the multicast packet is distributed according to either the first or the second distribution tree thereby preventing looping.

In another general embodiment, a method for providing vLAG in a TRILL-enabled network includes creating a virtual routing bridge logically connected to a first physical routing bridge and a second physical routing bridge to form a vLAG group at an edge of the TRILL-enabled network, determining a first distribution tree linking the first physical routing bridge to every other routing bridge in the TRILL-enabled network in a non-repeating fashion, ending with the second physical routing bridge, determining a second distribution tree linking the second physical routing bridge to every other routing bridge in the TRILL-enabled network in a non-repeating fashion, ending with the first physical routing bridge, receiving a multicast packet at the virtual routing bridge from one of the physical routing bridges, and distributing the multicast packet according to either the first or the second distribution tree thereby preventing looping.

In yet another general embodiment, a computer program product for providing vLAG in a TRILL-enabled network includes a computer readable storage medium having computer readable program code embodied therewith, the computer readable program code including computer readable program code configured for creating a virtual routing bridge logically connected to a first physical routing bridge and a second physical routing bridge to form a vLAG group at an edge of the TRILL-enabled network, computer readable program code configured for determining a first distribution tree linking the first physical routing bridge to every other routing bridge in the TRILL-enabled network in a non-repeating fashion, ending with the second physical routing bridge, and computer readable program code configured for determining a second distribution tree linking the second physical routing bridge to every other routing bridge in the TRILL-enabled network in a non-repeating fashion, ending with the first physical routing bridge, wherein when a multicast packet is received by the virtual routing bridge from one of the physical routing bridges, the multicast packet is distributed according to either the first or the second distribution tree thereby preventing looping.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A non-transitory computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM), a Blu-Ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fiber, etc.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer or server may be connected to the user's computer through any type of network, including a local area network (LAN), storage area network (SAN), and/or a wide area network (WAN), any virtual networks, or the connection may be made to an external computer, for example through the Internet using an Internet Service Provider (ISP).

Aspects of the present invention are described herein with reference to flowchart illustrations and/or block diagrams of methods, apparatuses (systems), and computer program products according to various embodiments of the invention. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
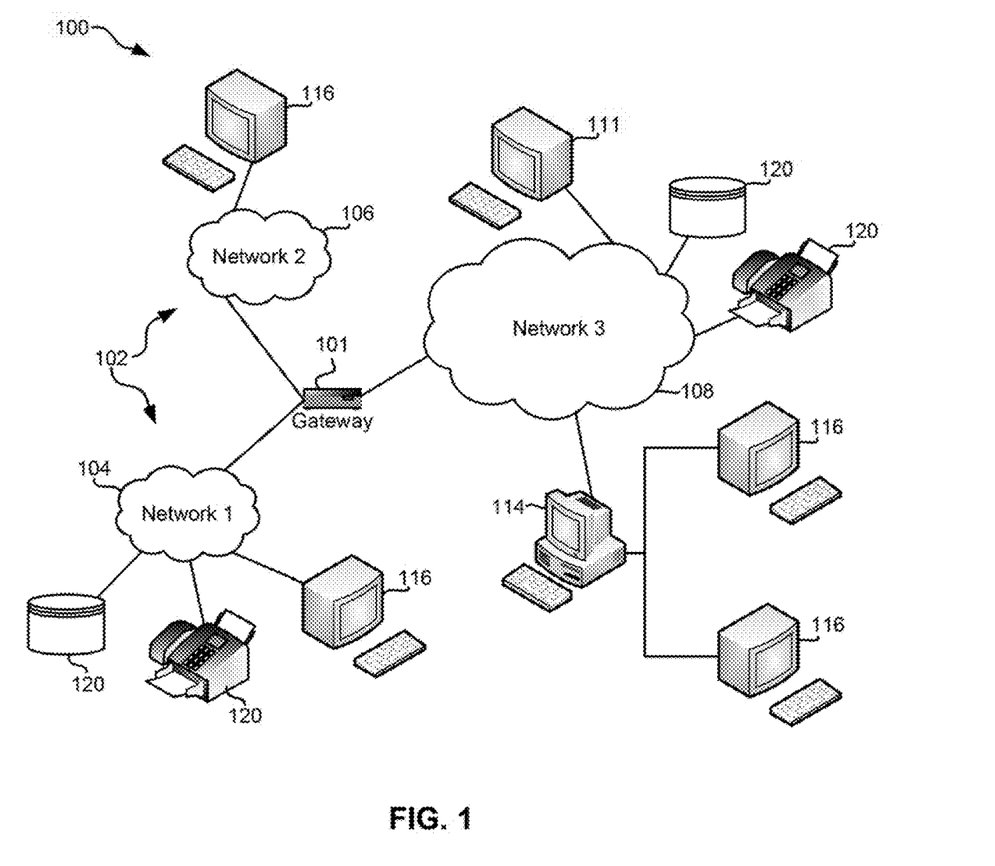
FIG. 1 illustrates a network architecture, in accordance with one embodiment.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a VLAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
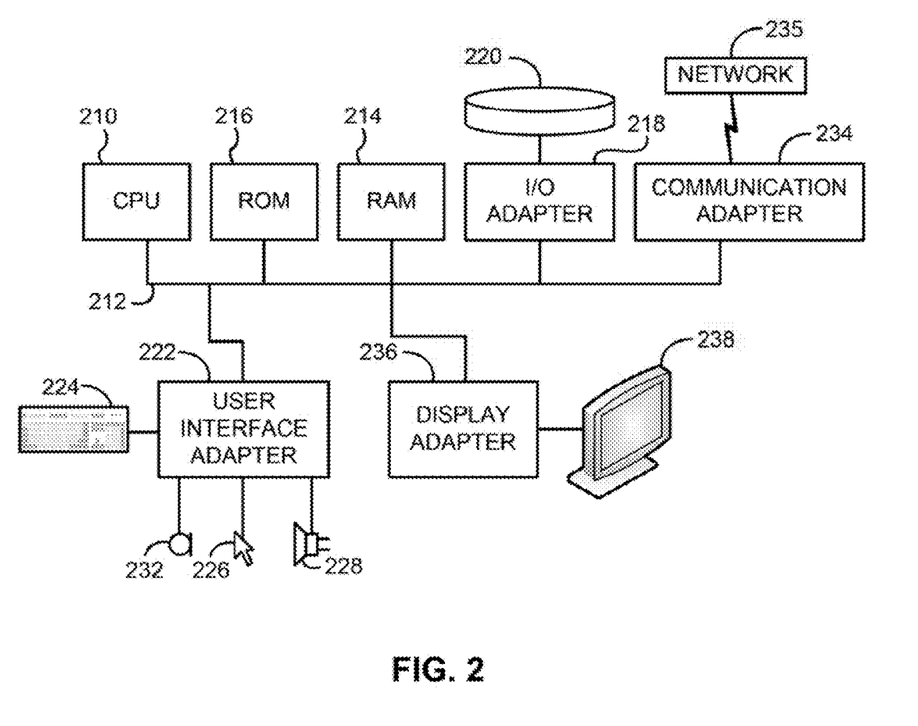
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit (CPU) 210, such as a microprocessor, and a number of other units interconnected via one or more buses 212 which may be of different types, such as a local bus, a parallel bus, a serial bus, etc., according to several embodiments.

The workstation shown in FIG. 2 includes a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

Figure 3:
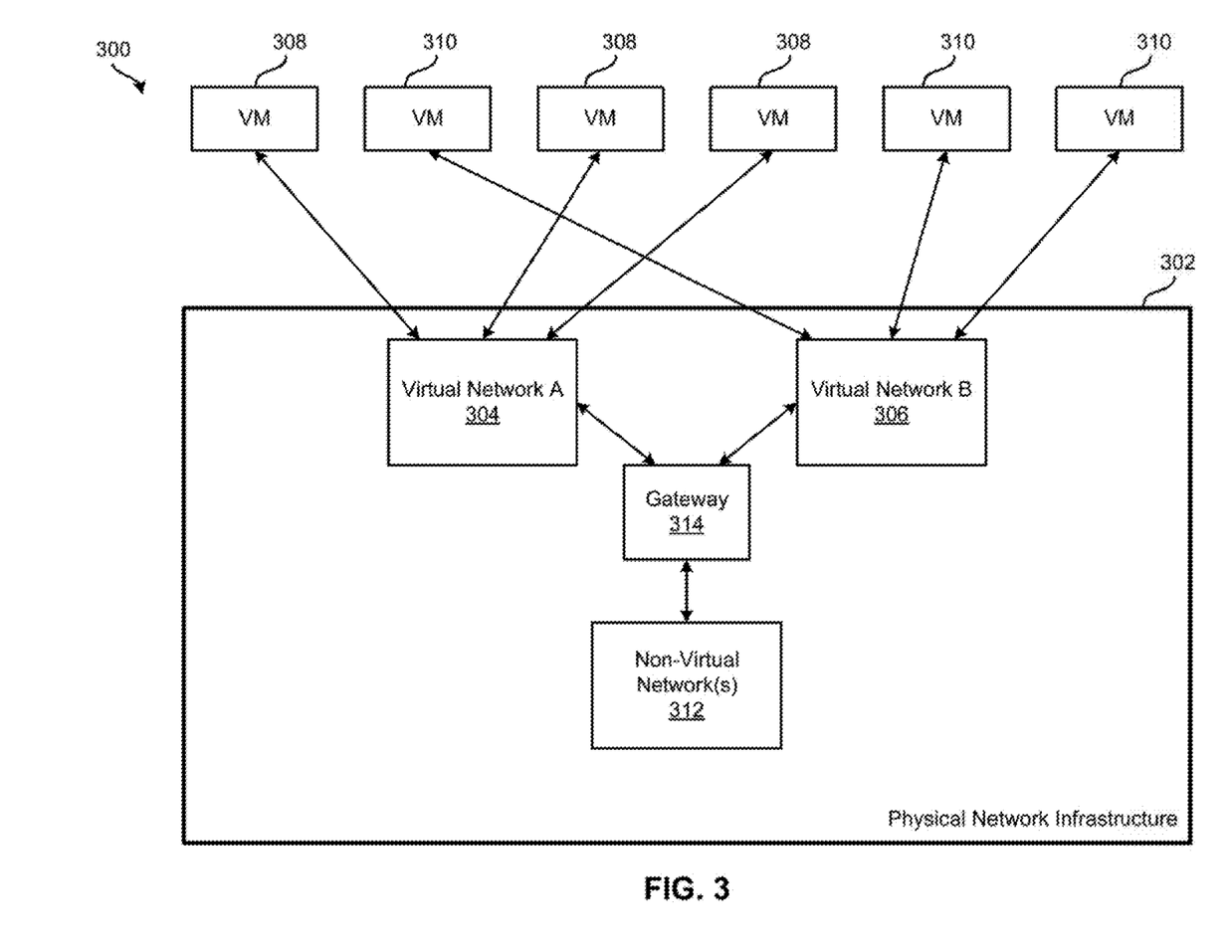
FIG. 3 is a simplified diagram of a virtualized data center, according to one embodiment.

Referring now to FIG. 3, a conceptual view of an overlay network 300 is shown according to one embodiment. In order to virtualize network services, other than simply providing a fabric path (connectivity) between devices, services may be rendered on packets as they move through the gateway 314 which provides routing and forwarding for packets moving between the non-virtual network(s) 312 and the Virtual Network A 304 and Virtual Network B 306. The one or more virtual networks 304, 306 exist within a physical (real) network infrastructure 302. The network infrastructure 302 may include any components, hardware, software, and/or functionality typically associated with and/or used in a network infrastructure, including, but not limited to, switches, connectors, wires, circuits, cables, servers, hosts, storage media, operating systems, applications, ports, I/O, etc., as would be known by one of skill in the art. This network infrastructure 302 supports at least one non-virtual network 312, which may be a legacy network.

Each virtual network 304, 306 may use any number of virtual machines (VMs) 308, 310. In one embodiment, Virtual Network A 304 includes one or more VMs 308, and Virtual Network B 306 includes one or more VMs 310. As shown in FIG. 3, the VMs 308, 310 are not shared by the virtual networks 304, 306, but instead are exclusively included in only one virtual network 304, 306 at any given time.

According to one embodiment, the overlay network 300 may include one or more cell switched domain scalable fabric components (SFCs) interconnected with one or more distributed line cards (DLCs).

By having a "flat switch" architecture, the plurality of VMs may move data across the architecture easily and efficiently. It is very difficult for VMs, generally, to move across layer 3 (L3)-domains, between one subnet to another subnet, internet protocol (IP) subnet to IP subnet, etc. But if it the architecture is similar to a large flat switch, in a very large layer 2 (L2)-domain, then the VMs are aided in their attempt to move data across the architecture.

According to various embodiments, which may be implemented in an existing or new network architecture, many advantages over existing technologies become evident. Each embodiment creates a unique value proposition in a possible final solution which may be implemented as a method, system, and/or computer program product, as described in more detail herein.

In one embodiment, a single virtual instance of a routing bridge (RB) may be formed when two or more RBs are combined together and at least one virtual Link Aggregation (vLAG) interface may be configured for these RBs. Existing solutions limit the number of RBs to only two, but according to embodiments described herein, there is no limit on the number of RBs that may be included in the vLAG interface.

In another embodiment, the management, runtime, and configuration state of any vLAG instance may be synchronized across all RBs using the TRILL backplane. A separate control channel over the TRILL fabric may be created in order to provide for this synchronization. One advantage of this embodiment is that it removes the requirement of having a separate link between the 802.1 bridges that have physical ports belonging to the LAG instance. This is a key differentiator compared to some of the existing technologies.

According to another embodiment, two or more multicast distribution trees may be created for load balancing multi-destination frames over the RBs hosting the port channels. This allows for load balancing across more than two RBs.

In yet another embodiment, usage of data path based media access control (MAC)-address learning may be enabled at any edge RBs (RBs at an edge of the TRILL-based fabric network). Unicast and multicast (one or multiple destination) packets from all the physical ports of the LAG may use the same source RB. This avoids signaling overhead for MAC to RB mapping across all the RBs that are part of the TRILL-based fabric network.

According to yet another embodiment, the possibility of using multiple mechanisms to handle link failures is provided. This provides even greater support for link failures to reduce or eliminate dropped packets and/or misrouted data due to failed links.

Figure 4A:
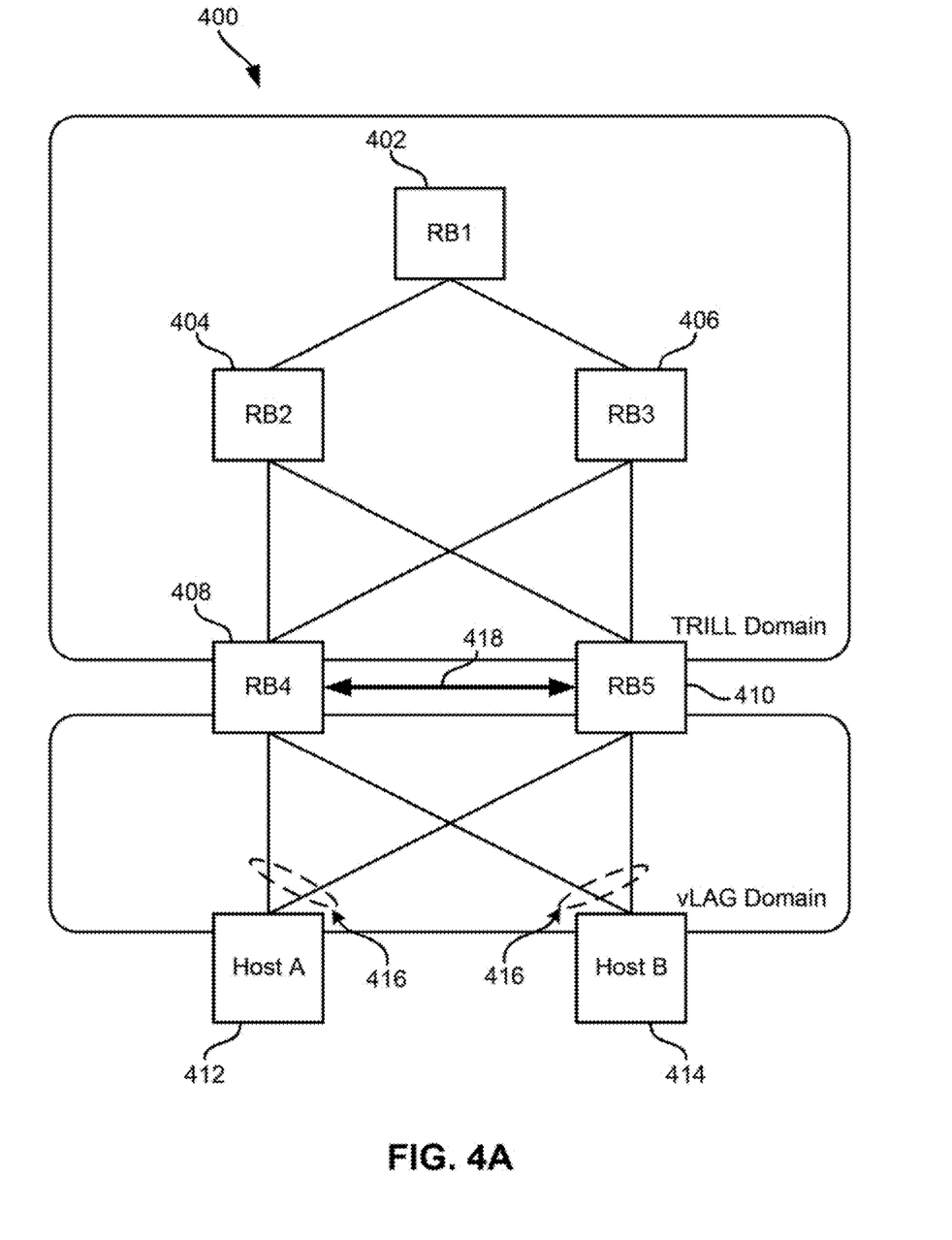
FIG. 4A shows a physical network topology, according to one embodiment.

According to one embodiment, and in order to more clearly describe advantages over the prior art, a physical network topology 400 is shown in FIG. 4A, the description of which may be used for all subsequent descriptions. In this physical topology 400, various routing bridges (RBs) are positioned across a TRILL-based fabric network (TRILL Domain). The RBs at the edge of the TRILL Domain, RB4 408 and RB5 410, are referred to as edge RBs. The remaining RBs, RB1 402, RB2 404, and RB3 406, may be connected to one another in any known fashion. As shown in FIG. 4A, RB2 404 and RB3 406 are connected to the edge RBs 408, 410 in a redundant manner, but this is not necessarily required. In order to provide vLAG 416 for Host A 412 and Host B 414, the edge RBs 408, 410 utilize an Inter Switch Link (ISL) 418.

Figure 4B:
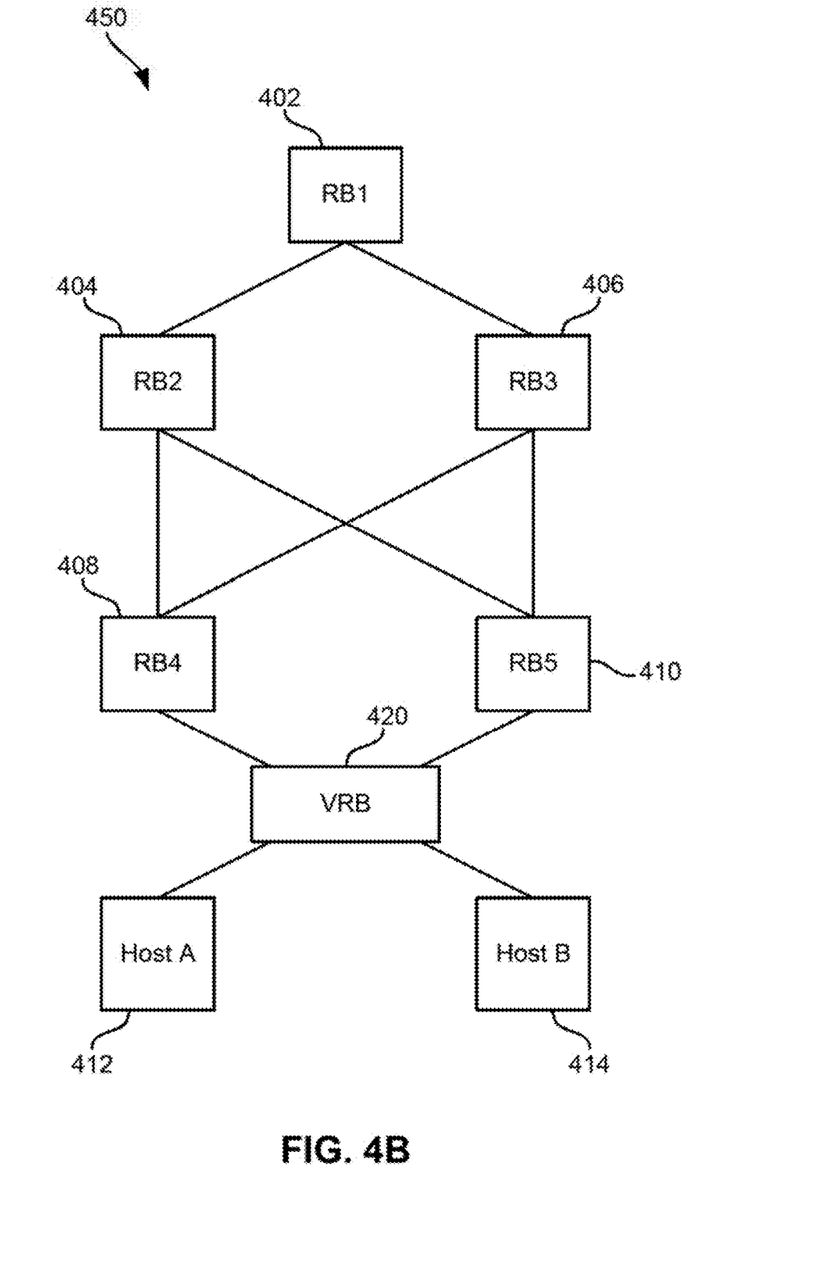
FIG. 4B shows a logical network topology, according to one embodiment.

However, in one embodiment, this ISL 418 may be removed from the architecture, which also eliminates the issues that affect use of such an ISL 418. In one embodiment, as shown in FIGS. 4A-4B, a virtual routing bridge (VRB) instance 420 may be created as soon as at least one vLAG instance 416 is configured. All of the vLAG ports 416 may now be represented as being connected to the VRB 420 instead of to the RBs 408, 410. This is shown in the logical topology 450 shown in FIG. 4B.

As shown in FIG. 4B, the VRB 420 may be configured to be connected to physical RBs in the TRILL Domain: RB4 408 and RB5 410. As a result, RB4 408 and RB5 410 may have an instance of VRB 420 associated with them for the vLAG ports 416 connected thereto. All unicast packets originating from the vLAG ports 416 will originate with the VRB 420 represented as the source RB in the TRILL header, as would be understood by one of skill in the art. This enables all the other edge RBs, e.g., RBs bridging the TRILL Domain, such as RB4 408 and RB5 410, to learn media access control (MAC) addresses with the associated RB as VRB 420.

Packets destined to the VRB 420 hosted by RB4 408 or RB5 410 may be treated as though they are destined for RB4 408 or RB5 410 and may be decapsulated and forwarded locally, in one embodiment. The VRB 420 may always appear as a node in the shortest path first (SPF) calculation for all the RBs in the TRILL network. Since the VRB 420 is seen as connected to both RB4 408 and RB5 410, the SPF calculation always performs Equal Cost Multi-Path (ECMP) calculations to reach all the unicast MAC-addresses terminated at the VRB 420. This achieves load balancing that benefits unicast packets that originate for the vLAG ports 416 connected to the VRB 420.

Multi-destination packets do not use the same SPF algorithm as used for unicast packets reachability and load balancing. Accordingly, in one embodiment, at least two trees, T1 and T2, that span the entire TRILL-based fabric network may be created. These trees may be advertised into all the RBs forming the TRILL-based fabric network. This should provide the ability to load balance multi-destination packets using these two trees, T1 and T2.

Figure 5A:
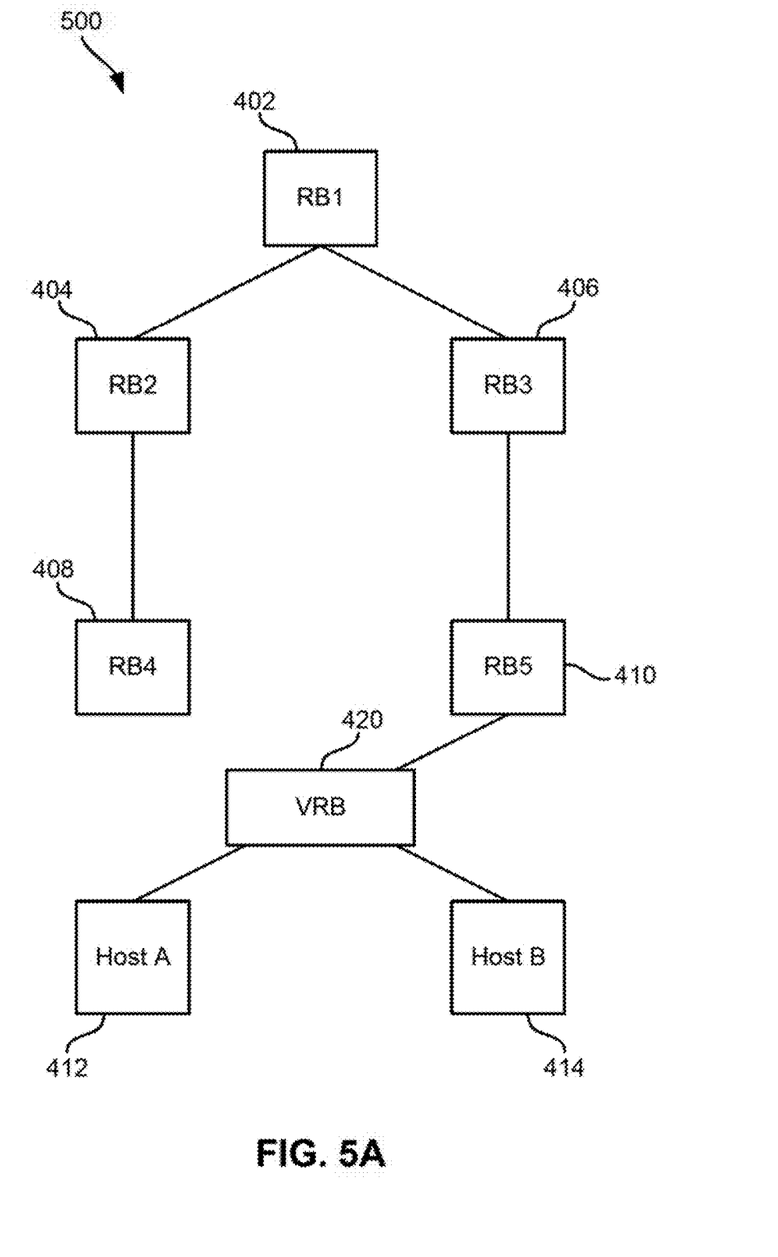
FIGS. 5A-5D show distribution trees in a logical topology, according to various embodiments.
Figure 5B:
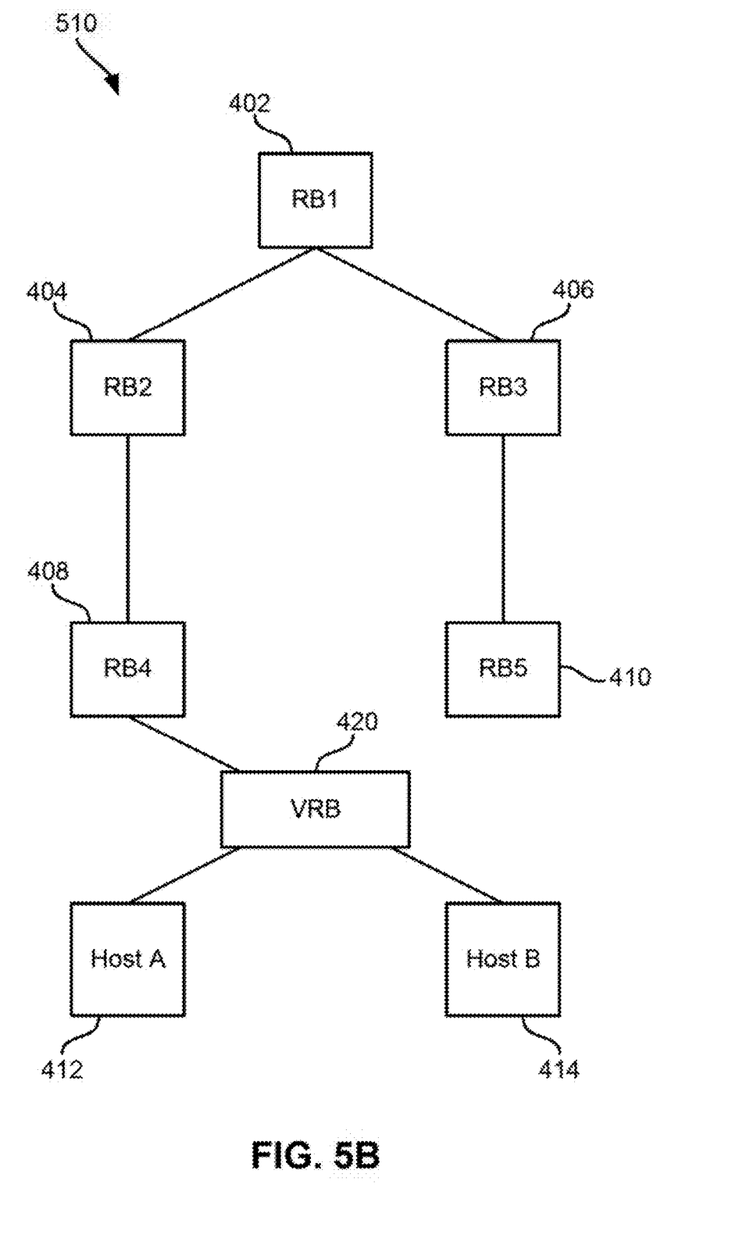
Figure 5C:
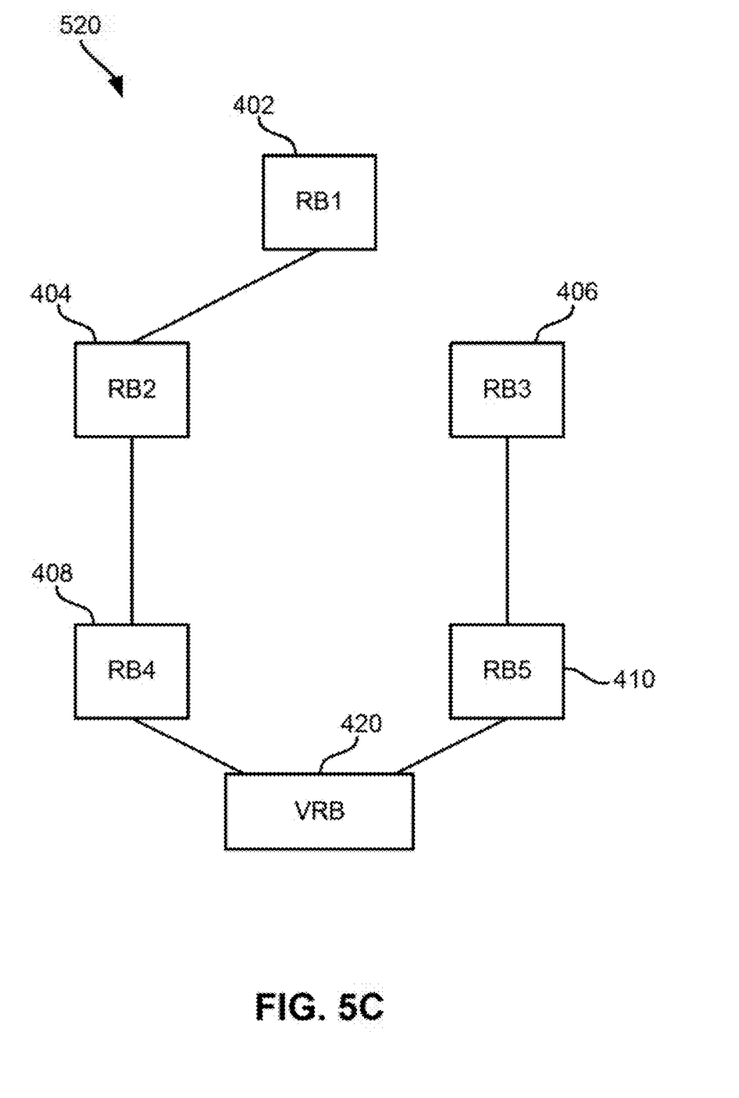
Figure 5D:
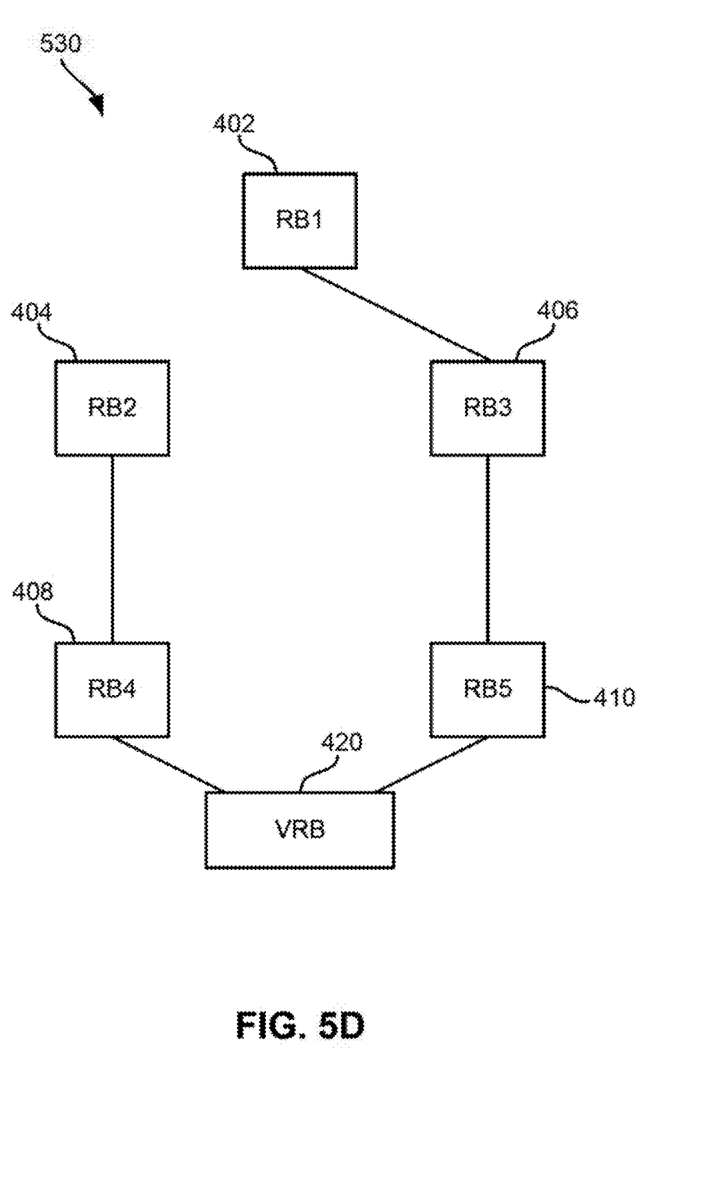

Now referring to FIGS. 5A-5B, logical topologies 500, 510, for distribution trees T1 and T2, respectively, are shown assuming that the tree is rooted as RB1 402 or higher up (e.g., beyond and connected to RB1 402). FIGS. 5C-5D provide logical topologies 520, 530, for T1 and T2, respectively, assuming that the tree is rooted at the VRB 420 or below. These trees may be constructed using existing TRILL mechanisms.

Loop prevention for multi-destination frames may be provided by the logical topologies 500, 510, 520, and 530 shown in FIGS. 5A-5D, according to various embodiments. As an example, consider some of the RPF checks that may be implemented at RB2 404 for multicast packets originating from the VRB 420 for scenarios explained in FIGS. 5A-5B. Packets originating from a physical link part of a vLAG port connected to RB5 410 may identify the source RB as the VRB 420 and the destination tree TL. RB2 404 may only select the link to RB1 402 as the RPF link for tree T1 in FIG. 5A, according to one embodiment. Packets originating from a physical link part of the vLAG port connected to RB4 408 may identify the source RB as the VRB 402 and destination tree T2, in one approach. RB2 404 may only select the link to RB4 408 as the RPF link for destination tree T2 in FIG. 5B, in one embodiment.

Now consider some of the RPF checks that may be implemented at the VRB 420 for multicast packets originating from RB1 402 for scenarios explained in FIGS. 5C-5D. RB1 402 may pick T1 and T2 based on some packet attributes for load balancing. It is noted that RB1 402 may pick different trees to load balance multicast packets across the vLAG links.

The RPF link for packets destined to the VRB 402 for T1 may be modeled as a link from RB4 408 to RB1 402. In addition, the RPF link for packets destined to the VRB 402 for T2 may be modeled as a link from RB5 410 to RB1 402.

MAC address learning in the embodiments shown in FIGS. 5A-5D may rely on the VRB 402. As explained earlier, it is noted that unicast as well as multicast packets use the same VRB 402 for packets originating from a vLAG port. All the RBs in the TRILL domain may learn the MAC address based on data plane activity. No out of band MAC address synchronization protocol, such as End System Address Distribution Information (ESADI), is required.

For packet filtering in the embodiments shown in FIGS. 5A-5D, since all the ports in the vLAG domain represent a single logical entity, multi-destination packets sent to vLAG are sent to only one physical port in that vLAG. For example, in the distribution tree topologies represented in FIGS. 5A-5B, RBs which do not have links to the VRB 402 must drop those packets. For IPv4/IPv6 multi-destination packets, RBs may prune the (MAC address, VLAN) for the corresponding tree based on the local state defined by the Internet Group Management Protocol (IGMP)/Multicast Listener Discovery (MLD) snooping databases.

For link failures in the embodiments shown in FIGS. 5A-5D, there are some corner cases where the last link in a vLAG port goes down which essentially tears down the connectivity between the host (Host A 412 or Host B 414) and the VRB 402. Many such vLAG instances may be connected in the whole TRILL domain. This link failure may be handled multiple ways. In one such embodiment, it is possible to create a dedicated ISL between the physical RBs, RB4 408 and RB5 410, which would only be used due to another link failure. On detection of the last physical port in the vLAG failing, all packets coming from the TRILL Domain are routed over the ISL to the other RB to maintain connectivity. This is what is done today also for handling vLAG link failures.

In another embodiment, a dedicated VRB 402 may be created for each vLAG instance, i.e., one VRB per vLAG instance. When the last link of a vLAG port fails, the VRB link state connectivity to that physical RB may be brought down and also published to the TRILL Domain. In this way, the IS-IS protocol may now converge for the new topology. Using this technique makes use of many VRBs in the data plane, for which support must be provided.

For data path based pruning, with unicast data traffic, a policy based on the Layer-2 (L2) Equal-Cost Multi-Path (ECMP) technique where a list of {MAC Destination Address, VLAN} pairs may be pruned from all the upstream neighbors ECMP link. To explain this further, consider FIG. 5A. Also consider a case where all ports for a given vLAG are now only physically connected to RB4 408. RB5 410 will detect this condition and will signal the upstream neighbors, which are RB2 404 and RB3 406 such that all the {MAC Destination Address, VLAN} pairs destined for the vLAG instance may be primed. When the first LAG port member comes up in RB5 410, it will again signal the upstream to stop the pruning of the (MAC Destination Address, VLAN) pair sent earlier. This uses an extension to the IS-IS protocol, which is not described here.

For multi-destination data traffic, RB4 408 will now start accepting the traffic for both tree T1 and T2 until at least a part of the vLAG instance in RB5 410 comes back up. RB5 410 may also prune all the multi-destination traffic during the time where RB4 408 is accepting traffic on T1 and T2.

According to one embodiment, a system, according to the embodiments described above in relation to FIGS. 5A-5D, may comprise a TRILL-enabled network comprising: a first physical routing bridge 408 and a second physical routing bridge 410, logic adapted for creating a virtual routing bridge 420 logically connected to the first physical routing bridge 408 and the second physical routing bridge 410 to form a vLAG group at an edge of the TRILL-enabled network, logic adapted for determining a first distribution tree 510 linking the first physical routing bridge 408 to every other routing bridge in the TRILL-enabled network in a non-repeating fashion, ending with the second physical routing bridge 410, and logic adapted for determining a second distribution tree 500 linking the second physical routing bridge 410 to every other routing bridge in the TRILL-enabled network in a non-repeating fashion, ending with the first physical routing bridge 408, wherein when a multicast packet is received by the virtual routing bridge 420 from one of the physical routing bridges 408, 410, the multicast packet is distributed according to either the first or the second distribution tree thereby preventing looping.

Figure 6:
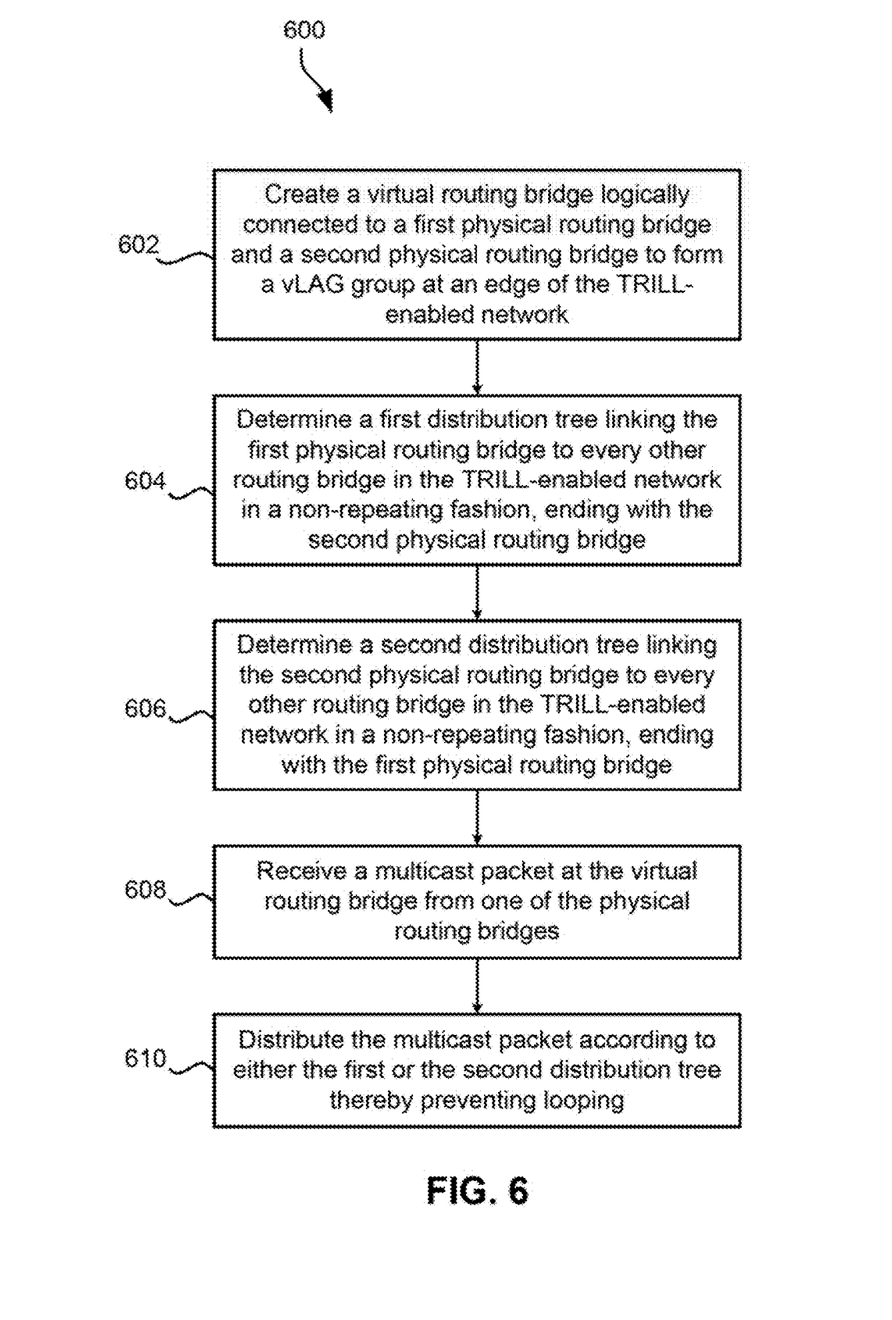
FIG. 6 shows a flowchart of a method, according to one embodiment.

Now referring to FIG. 6, a flowchart of a method 600 for providing vLAG in a TRILL-enabled network is shown, according to one embodiment. The method 600 may be performed in accordance with the present invention in any of the environments depicted in FIGS. 1-5D, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in one embodiment, the method 600 may be partially or entirely performed by a routing bridge, a processor (such as a CPU, an ASIC, an FPGA, etc.) in a routing bridge, a switch, a server, etc., or any other suitable device.

As shown in FIG. 6, method 600 may initiate with operation 602, where a virtual routing bridge is created that is logically connected to a first physical routing bridge and a second physical routing bridge to form a vLAG group at an edge of the TRILL-enabled network. Any system, processor, or device may create the VRB, including a controller of the TRILL-enabled network, in one embodiment.

In accordance with another embodiment, a dedicated virtual routing bridge may be created for each vLAG group at an edge of the TRILL-enabled network.

In another embodiment, one VRB may be created for each vLAG group. In more approaches, more VRBs may be created than there are vLAG groups, or more vLAG groups may exist that share one or more VRBs.

In operation 604, a first distribution tree is determined that links the first physical routing bridge to every other routing bridge in the TRILL-enabled network in a non-repeating fashion, ending with the second physical routing bridge. This may be similar to, but not limited to, the distribution tree 510 shown in FIG. 5B, as one example of a possible distribution tree, where the first physical routing bridge would be RB4 408 and the second physical routing bridge would be RB5 410.

Referring again to FIG. 6, in operation 606, a second distribution tree is determined linking the second physical routing bridge to every other routing bridge in the TRILL-enabled network in a non-repeating fashion, ending with the first physical routing bridge. Again, this may be similar to, but not limited to, the distribution tree 500 shown in FIG. 5A, as one example of a possible distribution tree, where the first physical routing bridge would be RB4 408 and the second physical routing bridge would be RB5 410.

Referring again to FIG. 6, in optional operation 608, a multicast packet may be received at the virtual routing bridge from one of the physical routing bridges. Any type of multicast packet, as known in the art, may be received and more than one packet may be received.

In optional operation 610, the multicast packet may be distributed according to either the first or the second distribution tree thereby preventing looping.

In one embodiment, when the multicast packet is received by the first physical routing bridge, the multicast packet may be distributed according to the first distribution tree.

In another embodiment, when the multicast packet is received by the second physical routing bridge, the multicast packet may be distributed according to the second distribution tree.

The method 600, in more embodiments, may further include synchronizing the first and second physical routing bridges whenever a change is detected using TRILL protocol as a control plane fabric. In this way, an ISL is not necessarily needed to share information between the physical routing bridges in the TRILL-enabled network. However, in some embodiments, an ISL may be provided to enable sharing of information in the case of link failure between routing bridges.

According to one embodiment, there is not provided an ISL between the first and the second physical routing bridges.

In more embodiments, the virtual routing bridge may be used as a source address for distribution of the multicast packet through the first and second distribution trees.

In one approach, the method 600 may further comprise logically connecting the VRB to additional physical routing bridges and determining a distribution tree linking each of the additional physical routing bridges, wherein each additional distribution tree links an additional physical routing bridge to every other routing bridge in the TRILL-enabled network in a non-repeating fashion, ending with the additional physical routing bridge. Accordingly, there may be an additional distribution tree for each additional physical routing bridge logically connected to the VRB.

According to another approach, the method 600 may further comprise designating the virtual routing bridge as an originating routing bridge for a unicast packet originated by a physical routing bridge and learning a MAC address of the physical routing bridge which originated the unicast packet.

The method 600 may be performed, in various embodiments comprising all or some of the operations described in FIG. 6, in computer program products, other methods, logic, and/or systems, such as that described above in relation to FIGS. 5A-5D, among others.

In one such embodiment, a computer program product for providing vLAG in a TRILL-enabled network comprises a computer readable storage medium having computer readable program code embodied therewith. The computer readable program code comprises computer readable program code configured for creating a virtual routing bridge logically connected to a first physical routing bridge and a second physical routing bridge to form a vLAG group at an edge of the TRILL-enabled network; computer readable program code configured for determining a first distribution tree linking the first physical routing bridge to every other routing bridge in the TRILL-enabled network in a non-repeating fashion, ending with the second physical routing bridge; and computer readable program code configured for determining a second distribution tree linking the second physical routing bridge to every other routing bridge in the TRILL-enabled network in a non-repeating fashion, ending with the first physical routing bridge. When a multicast packet is received by the virtual routing bridge from one of the physical routing bridges, the multicast packet is distributed according to either the first or the second distribution tree thereby preventing looping.

In a further embodiment, computer readable program code configured for synchronizing the first and second physical routing bridges whenever a change is detected using TRILL protocol as a control plane fabric; computer readable program code configured for using the virtual routing bridge as a source address for distribution of the multicast packet; computer readable program code configured for, when the multicast packet is received by the first physical routing bridge, distributing the multicast packet according to the first distribution tree, and/or computer readable program code configured for, when the multicast packet is received by the second physical routing bridge, distributing the multicast packet according to the second distribution tree, wherein the virtual routing bridge is used as a source address for distribution of the multicast packet, may be included in the computer program product.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A method for providing virtual link aggregation (vLAG) in a transparent interconnection of lots of links (TRILL)-enabled network, the method comprising:
    creating a virtual routing bridge logically connected to a first physical routing bridge and a second physical routing bridge to form a vLAG group at an edge of the TRILL-enabled network;
    determining a first distribution tree linking the first physical routing bridge to every other routing bridge in the TRILL-enabled network in a non-repeating fashion, ending with the second physical routing bridge;
    determining a second distribution tree linking the second physical routing bridge to every other routing bridge in the TRILL-enabled network in a non-repeating fashion, ending with the first physical routing bridge;
    receiving a multicast packet at the virtual routing bridge from one of the physical routing bridges; and
    distributing the multicast packet according to either the first or the second distribution tree thereby preventing looping.

2. The method as recited in claim 1, further comprising synchronizing the first and second physical routing bridges in response to a change in the TRILL-enabled network being detected using a separate control channel of the TRILL-enabled network as a control plane fabric.

3. The method as recited in claim 1, with the proviso that an inter switch link (ISL) is not provided between the first and the second physical routing bridges.

4. The method as recited in claim 1, wherein the virtual routing bridge is used as a source address for distribution of the multicast packet.

5. The method as recited in claim 1, wherein when the multicast packet is received by the first physical routing bridge, the multicast packet is distributed according to the first distribution tree.

6. The method as recited in claim 1, wherein when the multicast packet is received by the second physical routing bridge, the multicast packet is distributed according to the second distribution tree.

7. The method as recited in claim 1, further comprising:
    logically connecting the virtual routing bridge to additional physical routing bridges; and
    determining a distribution tree linking for each of the additional physical routing bridges, wherein each additional distribution tree links an additional physical routing bridge to every other routing bridge in the TRILL-enabled network in a non-repeating fashion, ending with the additional physical routing bridge.

8. The method as recited in claim 1, further comprising:
designating the virtual routing bridge as an originating routing bridge for a unicast packet originated by a physical routing bridge; and
learning a media access control (MAC) address of the physical routing bridge which originated the unicast packet.

9. The method as recited in claim 1, wherein a dedicated virtual routing bridge is created for each vLAG group at an edge of the TRILL-enabled network.

10. A method for providing virtual link aggregation (vLAG) in a transparent interconnection of lots of links (TRILL)-enabled network, the method comprising:
creating a virtual routing bridge logically connected to at least a first physical routing bridge and a second physical routing bridge to form a vLAG group at an edge of the TRILL-enabled network;
determining a first distribution tree linking the first physical routing bridge to every other routing bridge in the TRILL-enabled network in a non-repeating fashion, ending with the second physical routing bridge;
receiving a multicast packet at the virtual routing bridge from one of the physical routing bridges;
distributing the multicast packet according to the first distribution tree thereby preventing looping in the TRILL-enabled network; and
synchronizing the first and second physical routing bridges using a separate control channel of the TRILL-enabled network as a control plane fabric in response to determination of a change in the TRILL-enabled network.

11. The method as recited in claim 10, with the proviso that an inter switch link (ISL) is not provided between the first and the second physical routing bridges.

12. The method as recited in claim 10, wherein the virtual routing bridge is used as a source address for distribution of the multicast packet.

13. The method as recited in claim 10, wherein the multicast packet is distributed according to the first distribution tree in response to receipt of the multicast packet by the first physical routing bridge.

14. The method as recited in claim 10, further comprising determining a second distribution tree linking the second physical routing bridge to every other routing bridge in the TRILL-enabled network in a non-repeating fashion, ending with the first physical routing bridge, wherein the multicast packet is distributed according to the second distribution tree in response to receipt of the multicast packet by the second physical routing bridge.

15. The method as recited in claim 10, further comprising:
logically connecting the virtual routing bridge to additional physical routing bridges; and
determining additional distribution trees for each of the additional physical routing bridges, wherein each additional distribution tree links one of the additional physical routing bridges to every other routing bridge in the TRILL-enabled network in a non-repeating fashion, ending with a physical routing bridge in the vLAG group other than the one of the additional physical routing bridges.

16. The method as recited in claim 15, wherein the multicast packet is distributed according to an additional distribution tree associated with the additional physical routing bridge which received the multicast packet.

17. The method as recited in claim 10, further comprising:
designating the virtual routing bridge as an originating routing bridge for a unicast packet originated by a physical routing bridge in the VLAG group; and
learning a media access control (MAC) address of the physical routing bridge which originated the unicast packet in response to sending the unicast packet from the physical routing bridge in the VLAG group.

18. The method as recited in claim 10, wherein a dedicated virtual routing bridge is created for each vLAG group at an edge of the TRILL-enabled network.

19. The method as recited in claim 18, further comprising publishing, to the TRILL-enabled network, a virtual routing bridge link state for the vLAG group as failed in response to all ports of the vLAG group failing.

* * * * *